United States Patent [19]
Krapcho et al.

[11] 3,926,988
[45] Dec. 16, 1975

[54] SUBSTITUTED PYRAZOLES

[75] Inventors: John Krapcho, Somerset; Chester Frank Turk, Kendall Park, both of N.J.

[73] Assignee: E. R. Squibb & Sons, Inc., Princeton, N.J.

[22] Filed: May 6, 1974

[21] Appl. No.: 467,047

[52] U.S. Cl. ............... 260/247.5 EP; 260/268 TR; 260/293.6; 260/310 R; 424/248; 424/267; 424/250; 424/273
[51] Int. Cl.² ..................................... C07D 231/54
[58] Field of Search .... 260/247.5 EP, 293.6, 310 R, 260/208 TR

[56] References Cited
OTHER PUBLICATIONS
Awad, C.A. Vol. 79:92098.

*Primary Examiner*—Lorraine A. Weinberger
*Assistant Examiner*—Richard D. Kelly
*Attorney, Agent, or Firm*—Laurence S. Levinson; Merle J. Smith; Burton Rodney

[57] ABSTRACT

Compounds of the formula

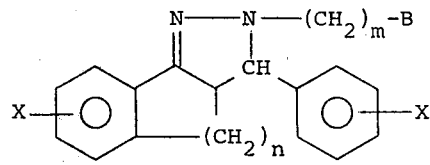

exhibit CNS depressant activity.

10 Claims, No Drawings

SUBSTITUTED PYRAZOLES

OBJECTS OF THE INVENTION

It is an object of the present invention to provide compounds having central nervous system (CNS) depressant activity. Another object is to provide a method for the preparation of these compounds. These and other objects of the present invention will be apparent from the following description.

SUMMARY OF THE INVENTION

Compounds of the formula

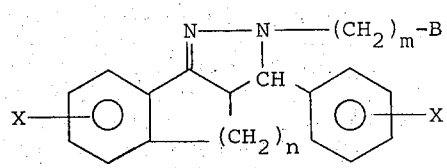

wherein n is 1, 2 or 3, m is 2, 3 or 4, X is H, halogen, preferably Cl or F, alkyl of 1 to 3 carbons, alkoxy of 1 to 3 carbons or $CF_3$, and B is lower alkylamino wherein the alkyl group has from 1 to 3 carbons, dilower alkylamino wherein each alkyl group has from 1 to 3 carbons, piperidino, pyrrolidino, morpholino, N-lower alkylpiperazino wherein the alkyl radical has from 1 to 3 carbons or N-(2-hydroxyethyl)-piperazino; and the N-oxides and pharmaceutically acceptable acid-addition salts thereof have been found to exhibit CNS depressant activity in mammalian species, e.g., mice and rats, and are useful as tranquilizers.

DETAILED DESCRIPTION

The compounds of the present invention may be prepared by reacting a ketone of formula I wherein X and m are as defined above

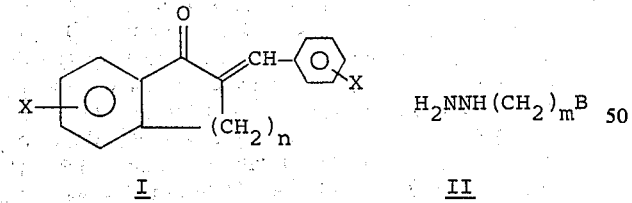

with a hydrazinealkyl-B compound of formula II wherein B is as defined above to produce the final product of formula III.

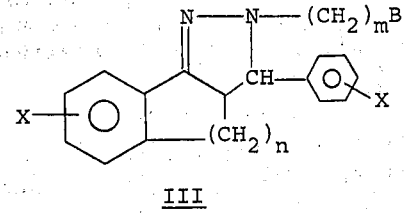

The reaction takes place by refluxing in a polar organic solvent, preferably an aliphatic alkanol of from 1 to 5 carbons or dimethylformamide, at a temperature of from about 40° to about 120°C, preferably at about the reflux temperature of the solvent, for from about ½ hour to about 12 hours, preferably for from about 2 to about 6 hours.

Alternatively, a compound of formula III may be prepared by reacting a compound of formula I with a hydroxyalkyl hydrazine to produce a compound of formula IV. This reaction

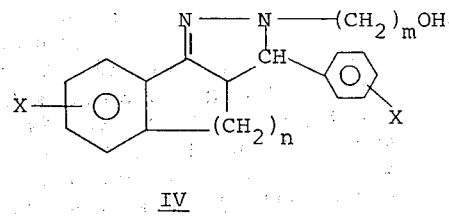

takes place under the same conditions as above. The compound of formula IV is then converted to the corresponding tosylate ester by treatment with tosyl chloride by known methods followed by treating the tosylate with an amine of the formula H-B (wherein B is as defined above) by known methods to produce a compound of formula III.

The starting compounds of formula I may be prepared by reacting a phenylalkanoic acid of the formula

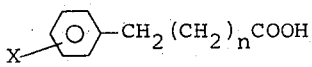

with polyphosphoric acid by known methods, or with $SOCl_2$ followed by $AlCl_3$ by known methods to produce a ketone of the formula

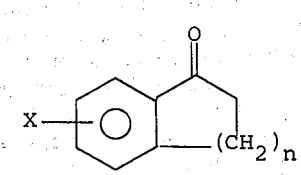

which is then reacted with a benzaldehyde of the formula

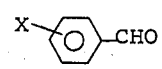

to yield the starting compounds of formula I. The latter reaction takes place by reacting the ketone and aldehyde in a polar organic solvent, preferably an aliphatic alkanol of from 1 to 5 carbons or dimethylformamide, at lowered temperatures of from about 0°C to about −25°C, preferably in the presence of an alkali.

The compounds of the present invention, their N-oxides and their pharmaceutically acceptable acid-addition salts are central nervous system depressants in mammals, e.g., mice and rats, and are effective as tranquilizers when administered in amount ranging from about 0.5 mg to about 10.0 mg per kg of body weight per day. A preferred dosage regimen for optimum results would be from about 1 mg to about 5 mg per kg of body weight per day, and such dosage units are employed that a total of from about 35 mg to about 7 g of active ingredient for a subject of about 70 kg body weight are administered in a 24 hour period.

It has been found that the basic group B is essential for CNS activity of the compounds of the present invention inasmuch as compounds without such a basic grup are inactive. For example, 2,3,3a,4-tetrahydro-2-methyl-3-phenylidino[1,2-c]pyrazole, which does not have a basic acid chain exhibits no CNS depressant activity.

As to the pharmaceutically acceptable salts, those coming within the purview of the invention include the pharmaceutically acceptable acid-addition salts. Acids useful for preparing these acid-addition salts include, inter alia, inorganic acids, such as the hydrohalic acids (e.g., hydrochloric and hydrobromic acid), sulfuric acid, nitric acid, and phosphoric acid, and organic acids such as maleic, fumaric, tartaric, citric, acetic, benzoic, 2-acetoxybenzoic, salicyclic, succinic acid, theophylline, 8-chlorotheophylline, p-aminobenzoic, p-acetamidobenzoic, or methanesulfonic.

The N-oxide derivatives of the compounds of the present invention are prepared by treating the free base with excess aqueous $H_2O_2$ in known manner. The N-oxide may, if desired, be converted to one of the above pharmaceutically acceptable acid-addition salts in the usual manner.

The compounds of the present invention in the described dosages are intended to be administered orally; however, other routes, such as rectally, intraperitoneally, subcutaneously, intramuscularly or intravenously may be employed.

The active compounds of the present invention are orally administered, for example, with an inert diluent or with an assimilable edible carrier, or they may be enclosed in hard or soft galatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. Such compositions and preparations should contain at least 0.1% of active compound. The percentage in the compositions and preparations may, of course, be varied and may conveniently be between about 5% to about 75% or more of the weight of the unit. The amount of active compound in such therepeutically useful compositions or preparations is such that a suitable dosage will be obtained. Preferred compositions or preparations according to the present invention are prepared so that an oral dosage unit form contains between about 2 and 500 milligrams of active compound, preferably between 2 and 25 mg.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

The following examples illustrate the present invention without, however, limiting the same thereto. All temperatures are expressed in degrees Centigrade.

EXAMPLE 1

2-[3-(Dimethylamino)propyl]-2,3,3a,4-tetrahydro-3-phenylindeno [1,2-c]pyrazole, citrate salt A. 2-Benzal-1-indanone A mixture of 100 g of indanone, 80.0 g of benzaldehyde and 500 ml of ethanol is stirred, the resulting solution is cooled to −10° and treated rapidly (3 min) with a solution of 5.0 g of KOH in 100 ml of ethanol. The solution is allowed to warm and the product begins to crystallize at 17° (cooled to keep under 15°). The resulting slurry is allowed to sitr at 20°–25° for 1 hour, and then poured onto 2 liters of ice-water. After standing for 3 hours, the solid is filtered, washed with cold water and allowed to air dry; wt., 161.3 g (96%), mp 101°–103°. Since a small amount of dimeric condensation product formed is not removed by crystallization, part of the solid material (150 g, in three positions) is distilled through a short-path apparatus to give 139.0 g of yellow distillate; bp 175°–180° (0.01 mm). The distillate rapidly solidifies and is crystallized from 350 ml of ethanol to give 128.4 g (83%) of pale yellow product, mp 106°–109°.

B. 2-[3-(Dimethylamino)propyl]-2,3,3a,4-tetrahydro-3-phenylindeno[1,2-c]pyrazole, citrate salt 2-Benzal-1-indanone, 11 g, is refluxed with 6.5 g of 3-dimethylaminopropylhydrazine in 170 ml of MeOH for 5 hours. The partly solid residue (17 g) from the MeOH evaporation is dissolved in 250 ml of ether, washed with $H_2O$ (4 × 50 ml), dried ($MgSO_4$), and the solvent evaporated to give 14.6 g of a yellow-orange viscous oil. The IR spectrum indicates the presence of unreacted 2-benzal-1-indanone. The material is dissolved in 70 ml of warm MeCN, stirred, and treated with a warm solution of 8.2 g of oxalic acid in 70 ml of MeCN; the oxalate is separated as a gelatinous precipitate. After cooling overnight, the material is filtered under $N_2$, washed with MeCN, thoroughly washed with ether, and dried in vacuo; wt., 15.5 g; mp 140–142° (s. 135°). Crystallization from 40 ml DMF 120 ml ether gives 12.4 g of light yellow solid; mp 143°–145° (s. 137°). The material yields 3.9 g of base as a brown oil ($K_2CO_3$, ether extractions). The latter ( 3.6 g) is dissolved in 200 ml of MeOH, treated with 2.4 g of citric acid.$H_2O$ (the color lightened somewhat), and the solvent removed on a rotary evaporator. The residue is triturated with ether and the evaporation repeated to give 6.0 g (22%) of a brittle, yellow, somewhat hygroscopic solid; mp 70°–74°.

EXAMPLE 2

3,3a,4,5-Tetrahydro-N,N-dimethyl-3-phenyl-2H-benz[g]indazole-2-propanamine, hydrochloride 2-Benzylidine-α-tetralone, 25 g, is refluxed with 14 g of 3-dimethylaminopropylhydrazine in 350 ml of MeOH for 5 hours to give 36 g of pale yellow solid. Following crystallization from 150 ml of MeCN, the colorless base weighs 26.3 g; mp 113°–115°.

A stirred and cooled suspension of the base (24.5 g) in 125 ml of EtOH is treated with 10 ml of 7.4 N alcoholic HCl. THe resulting solution is diluted to 700 ml with ether and rubbed; the crystalline HCl salt separated. After cooling overnight, the material is filtered, washed with ether, and dried in vacuo; wt., 24 g (58%); mp 127°–130°(s. 98°). Crystallization from 100 ml of MeCN gives 20.6 g (50%) of colorless product; mp 130°–132° (s. 105°).

EXAMPLES 3–6

Following the procedure of example 1 but substituting for benzaldehyde in part A an equivalent amount of the substituted benzaldehyde of column I, there is obtained, respectively, the corresponding compound of the formula

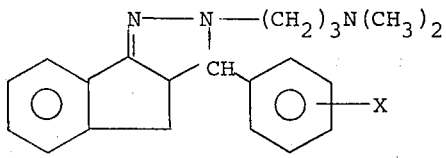

wherein X is the substituent in the position indicated in column II:

| Example | I | o | m | p |
|---|---|---|---|---|
| 3 | 2-methylbenzaldehyde | $CH_3$ | | |
| 4 | 3-trifluoromethyl-benzaldehyde | | $CF_3$ | |
| 5 | 4-methoxybenzaldehyde | | | $OCH_3$ |
| 6 | 2-chlorobenzaldehyde | Cl | | |

EXAMPLE 7

3a,4,5,6-Tetrahydro-N,N-dimethyl-3-phenylbenzo[6,7]cyclohepta[1,2-c]pyrazole-2(3H)-propanamine, hydrochloride Following the procedure of example 2 but substituting for 2-benzylidine-α-tetralone an equivalent amount of 2-benzylidene-α-suberone, a title compound is obtained.

EXAMPLE 8–11

Following the procedure of example 1 but substituting for benzaldehyde in part A an equivalent amount of the substituted benzaldehyde of column I, and substituting for indanone an equivalent amount of tetralone, there is obtained, respectively, the corresponding compound of the formula

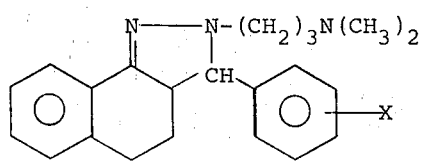

wherein X is the substituent in the position indicated in column II:

| Example | I | o | m | p |
|---|---|---|---|---|
| 8 | 4-fluorobenzaldehyde | | | F |
| 9 | 3-methylbenzaldehyde | | $CH_3$ | |
| 10 | 2-methoxybenzaldehyde | $OCH_3$ | | |

EXAMPLE 12–15

Following the procedure of example 1 but substituting for benzaldehyde in part A an equivalent amount of the substituted benzaldehyde of column I, and substituting for indanone an equivalent amount of suberone, there is obtained, respectively, the corresponding compound of the formula

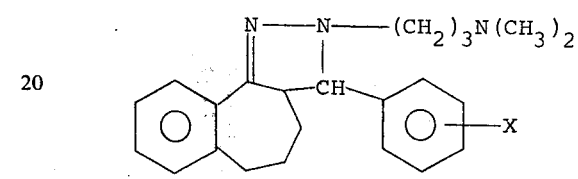

wherein X is the substituent in the position indicated in column II

| Example | I | o | m | p |
|---|---|---|---|---|
| 12 | 4-butoxybenzaldehyde | | | $OC_4H_9$ |
| 13 | 4-chlorobenzaldehyde | | | Cl |
| 14 | 3-trifluoromethyl-benzaldehyde | | $CF_3$ | |
| 15 | 2-methylbenzaldehyde | $CH_3$ | | |

EXAMPLES 16–20

Following the procedure of example 1 but substituting for 3-dimethylaminopropylhydrazine in part B an equivalent amount of the compound listed in column 1, there is obtained, respectively, the corresponding compound of the formula

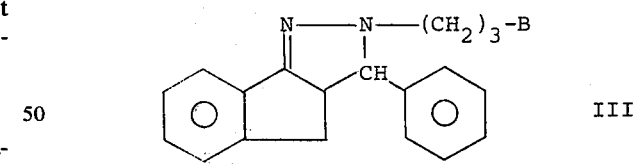

III wherein B is the radical indicated in column 2.

| | I | II |
|---|---|---|
| 16. | $H_2NNH-(CH_2)_3-N\langle\rangle$ | $-N\langle\rangle$ |
| 17. | $H_2NNH-(CH_2)_3-N\langle\rangle$ | $-N\langle\rangle$ |
| 18. | $H_2NNH-(CH_2)_3-N\langle O\rangle$ | $-N\langle O\rangle$ |

19. $H_2NNH-(CH_2)_3-N\underset{\smile}{\frown}N-CH_3$    $-N\underset{\smile}{\frown}N-CH_3$ 20. $H_2NNH-(CH_2)_3-N\underset{\smile}{\frown}N-CH_2CH_2OH$    $-N\underset{\smile}{\frown}N-CH_2CH_2OH$

EXAMPLES 21–26

Following the procedure of example 1 but substituting for 2-benzal-1-indanone in part A the substituted 2-benzal-1-indanone of the formula

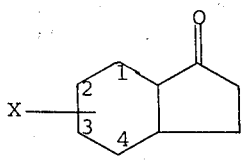

wherein X is the substituent in the positions indicated below,

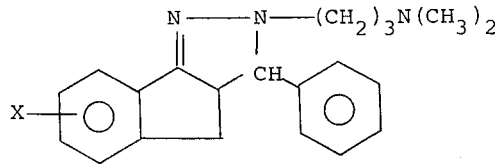

| Example | 1 | 2 | 3 | 4 |
|---|---|---|---|---|
| 21. | | | Cl | |
| 22. | | F | | |
| 23. | CH₃ | | | |
| 24. | | | | C₂H₅ |
| 25. | CF₃ | | | |
| 26. | | | OCH₃ | |

EXAMPLES 27–32

Following the procedure of example 2 but substituting for 2-benzylidine-α-tetralone the substituted tetralone of the formula

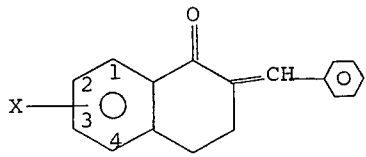

wherein X is the substituent in the position indicated, there is obtained the corresponding X-substituted 3,3a,4,5-tetrahydro-N,N-dimethyl-3-phenyl-2H-benz[g]indazole-2-propanamine, hydrochloride.

| Example | 1 | 2 | 3 | 4 |
|---|---|---|---|---|
| 27. | CH₃ | | | |
| 28. | | | Cl | |
| 29. | | | | F |
| 30. | Cl | | | |
| 31. | | OCH₃ | | |
| 32. | | CF₃ | | |

EXAMPLES 33–42

Following the procedure of example 7 but substituting for 2-benzylidene-α-tetralone, the X-substituted compound of the formula

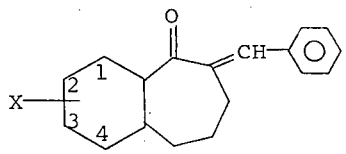

there is obtained respectively the corresponding X-substituted derivative of the final product of example 7 wherein X is the substituent in the position indicated.

| Example | 1 | 2 | 3 | 4 |
|---|---|---|---|---|
| 37. | CH₃ | | | |
| 38. | | CF₃ | | |
| 39. | | | Cl | |
| 40. | F | | | |
| 41. | | | CF₃ | |
| 42. | | | | OCH₃ |

EXAMPLE 43

3,3a,4,5-Tetrahydro-N,N-dimethyl-3-phenyl-2H-benz[g]indazole-2-ethanamine

A. 2-Benzylidene-1-tetralone

A solution of 115 g of α-tetralone and 80.0 g of benzaldehyde in 500 ml of ethanol is stirred, cooled to −10°, and treated with a solution of 5.0 g of KOH in 100 ml of ethanol. The cooling bath is removed and the solution allowed to warm to room temperature — a crystalline product begins to separatee at 22°. After standing ovenight at room temperature, the mixture is poured onto 2 liters of ice-water. This product is filtered, washed with cold water and allowed to dry overnight; wt., 171 g, mp 100°–102°. Distillation of this material (in 3 portions) gives 167 g of pale yellow distillate; bp 180°–185° (0.01 mm). After crystallization from 250 ml of ethanol, the pale yellow product weights 158 g (90%); mp 103°–105°.

B.    3,3a,4,5-Tetrahydro-3-phenyl-2H-benz[g]indazole-2-ethanol

A suspension of 23.4 g of the above material (finely-divided) in 350 ml of methanol is treated with 7.6 g of 2-hydroxyethylhydrazine. The suspension is heated and the resulting solution is refluxed for 6 hours. Removal of the solvent on a rotary evaporator leaves 31 g of pale yellow orange syrup. The latter is dissolved in 300 ml of ether, washed with 50 ml portions of water (5 times), dried over MgSO₄, filtered and the filtrate evaporated to give 27.1 g of pale yellow solid. Crystallization from 35 ml of acetonitrile gives 11.0 g, mp 112°–114° (s. 105°). Recrystallization from 11 ml of acetonitrile gives 10.2 g of nearly colorless solid, mp 112°–114° (s. 105°). Following recrystallization from 12 ml of ethanol, the colorless solid weighs 9.0 g (31%), mp 113°–115°.

C. 3,3a,4,5-tetrahydro-N,N-dimethyl-3-phenyl-2H-benz[g]indazole-2-ethanamine

The product from Part B is suspended in pyridine and treated with an equivalent quantity of tosyl chloride. After standing overnight at room temperature, the mixture is poured onto ice water. The resulting tosylate ester is suspended in benzene and treated with excess dimethylamine and allowed to stand at room temperature for 4 days. Evaporation of the solvent yields the title compound.

EXAMPLE 44

2-[3-(Dimethylamino)propyl]2,3,3a,4-tetrahydro-3-phenylindeno[1,2-c]pyrazolo, N-oxide A solution of the free base from Example 1 in acetonitrile is treated with two equivalents of hydrogen peroxide in acetic acid and the solution allowed to stand at room temperature for 8 hours. The solvent is removed to give the product.

What is claimed is:

1. A compound of the formula

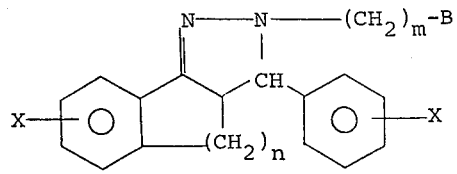

wherein X is H, halogen, alkyl of from 1 to 3 carbons, alkoxy of from 1 to 3 carbons or $CF_3$, $n$ is 1, 2 or 3, $m$ is 2, 3 or 4, and B is lower alkylamino wherein the alkyl group has from 1 to 3 carbons, dilower alkylamino wherein each alkyl group has from 1 to 3 carbons, piperidino, pyrrolidino, morpholino, N-lower alkylpiperazino wherein the alkyl radical has from 1 to 3 carbons, or N-(2-hydroxyethyl)piperazino; and N-oxides and pharmaceutically acceptable acid-addition salts thereof.

2. A compound according to claim 1 having the name 2-[3-(Dimethylamino)propyl]-2,3,3a,4-tetrahydro-3-phenylindeno[1,2-c]pyrazole, citrate salt.

3. A compound according to claim 1 having the name 3,3a,4,5-tetrahydro-N,N-dimethyl-3-phenyl-2H-benz[g]-indazole-2-propanamine, hydrochloride.

4. A compound according to claim 1 wherein $n$ is 1.

5. A compound according to claim 1 wherin $n$ is 2.

6. A compound according to claim 1 wherein $n$ is 3.

7. A compound according to claim 1 wherein B is lower alkyl amino wherein the alkyl group has from 1 to 3 carbons, dilower alkylamino wherein each alkyl group has from 1 to 3 carbons, piperidino or pyrrolidino.

8. A compound according to claim 1 wherein B is lower alkyl amino wherein the alkyl group has from 1 to 3 carbons, or dilower alkylamino wherein each alkyl group has from 1 to 3 carbons.

9. A compound according to claim 1 wherein B is piperidino, pyrrolidino, morpholino, N-lower alkylpiperazino wherein the alkyl radical has from 1 to 3 carbons, or N-(2-hydroxyethyl)piperazino.

10. A compound according to claim 1 wherein X is Cl or F.

* * * * *

UNITED STATES PATENT AND TRADEMARK OFFICE
CERTIFICATE OF CORRECTION

PATENT NO. : 3,926,988
DATED : December 16, 1975
INVENTOR(S) : John Krapcho et al.

It is certified that error appears in the above-identified patent and that said Letters Patent are hereby corrected as shown below:

```
Column 2, line 63, "amount" should read --amounts--.
Column 3, line 6, "grup" should read --group--.
Column 3, line 35, "galatin" should read --gelatin--.
Column 4, line 28, "positions" should read --portions--.
Column 8, line 45, "separatee" should read --separate--.
Column 8, line 46, "ovenight" should read --overnight--.
```

Signed and Sealed this thirtieth Day of March 1976

[SEAL]

Attest:

RUTH C. MASON
*Attesting Officer*

C. MARSHALL DANN
*Commissioner of Patents and Trademarks*